United States Patent
Hecht et al.

(10) Patent No.: US 11,741,538 B1
(45) Date of Patent: *Aug. 29, 2023

(54) AUTOMATED LENDING DATA COLLECTION AND VERIFICATION SYSTEM AND METHODS

(71) Applicant: Wells Fargo Bank, N.A., San Francisco, CA (US)

(72) Inventors: Alan W. Hecht, Chanhassen, MN (US); Ann M. Kirk, Deerwood, MN (US); Javier S. Silva, Concord, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/565,384

(22) Filed: Dec. 29, 2021

Related U.S. Application Data

(63) Continuation of application No. 15/487,016, filed on Apr. 13, 2017, now Pat. No. 11,227,332.

(60) Provisional application No. 62/322,509, filed on Apr. 14, 2016.

(51) Int. Cl.
*G06Q 40/00* (2023.01)
*G06Q 40/03* (2023.01)

(52) U.S. Cl.
CPC .................................. *G06Q 40/03* (2023.01)

(58) Field of Classification Search
CPC .............................. G06Q 40/00; G06Q 40/025
See application file for complete search history.

(56) References Cited

U.S. PATENT DOCUMENTS

| | | | |
|---|---|---|---|
| 9,953,318 | B1 | 4/2018 | Firstenberger |
| 2001/0029482 | A1 | 10/2001 | Tealdi et al. |
| 2005/0075911 | A1 | 4/2005 | Craven, Jr. |
| 2012/0226590 | A1 | 9/2012 | Love et al. |
| 2012/0330819 | A1 | 12/2012 | Weinflash et al. |
| 2016/0086263 | A1 | 3/2016 | Weinflash et al. |
| 2016/0104238 | A1 | 4/2016 | Loganathan et al. |
| 2016/0140654 | A1 | 5/2016 | Bhat et al. |

FOREIGN PATENT DOCUMENTS

IN 202221003789 A * 2/2022

OTHER PUBLICATIONS

The Role of Retail Banking in the U.S. Banking Industry: Risk, Return, and Industry Structure Economic Policy Review, vol. 13, No. 3, Dec. 2007 (Year: 2007).*

* cited by examiner

*Primary Examiner* — Lalita M Hamilton
(74) *Attorney, Agent, or Firm* — Foley & Lardner LLP

(57) ABSTRACT

A computer-implemented system and method receive information regarding a funds transfer from a payor to a payee. The information is received by a depository computer system. The depository computer system forwards the information regarding the funds transfer to an account verification service computer system. The depository receives an indication of a real-time account status of an account of the payor. The account status information is received from a paying bank computer system that maintains the account of the payor via the account verification service computer system. Release of the funds to the payee is authorized based on the account status information received via the account verification service computer system. The authorization occurs in real-time relative to when the funds transfer information is initially received.

20 Claims, 5 Drawing Sheets

AUTOMATED LENDING DATA COLLECTION AND VERIFICATION SYSTEM AND METHODS

CROSS-REFERENCE TO RELATED APPLICATIONS

This application is a continuation of U.S. patent application Ser. No. 15/487,016, entitled "Automated Lending Data Collection and Verification System and Methods," filed on Apr. 13, 2017, which claims the benefit of and priority to U.S. Provisional Patent Application No. 62/322,509, entitled "Automated Lending Data Collection and Verification System and Methods", filed on Apr. 14, 2016, each of which is incorporated herein by reference in their respective entireties and for all purposes.

TECHNICAL FIELD

Embodiments of the present disclosure relate generally to the field of verifying account and other consumer information when applying for a consumer loan, such as a mortgage. In particular, they relate to systems and methods for verifying account and lender information during loan applications from other financial institutions, intermediaries, and the loan requester.

BACKGROUND

The application process for a consumer loan can often be time consuming due to the amount of lending data required to properly and accurately evaluate the loan application. For example, financial information such as savings and/or checking account balances, asset verification, income verification, prior legal determinations (i.e. bankruptcy), and other asset and liability matters may need to be assessed prior to approving or denying a loan application. This process, particularly where the loan requester does not use the loan originating financial institution as their primary financial institution, can be time consuming, as the required lending data can be spread out among multiple financial institutions. This can require the loan requester to contact their financial institutions, as well as to review their own records, to provide the required lending data to the loan originating financial institution. Enhanced systems and methods of facilitating lending data exchanges between financial institutions would be desirable.

SUMMARY

A first example embodiment relates to a method. The method includes determining, by a loan originating financial institution computer system operated by a loan originating financial institution, required verification information needed to process a loan application associated with a loan applicant. The method further includes searching, by the loan originating financial institution computer system, an internal database to locate first information related to the applicant. The method includes determining, by the loan originating financial institution computer system, that second information is required after locating the first information in the internal database. The method further includes initiating, by the loan originating financial institution computer system, a request for the second information to an information provider computer system, the request accompanied by an identifier containing identifying information of the loan applicant. The method includes receiving, by the loan originating financial institution computer system, the requested additional information from the information provider computer system. The method further includes determining, by the loan originating financial institution computer system, a loan decision for the loan application based at least in part on the first information and the second information.

Another example embodiment relates to a financial institution computing system associated with a financial institution. The system includes an account database and a network interface. The network interface is structured to allow data communication over a network between the financial institution computer system and an intermediary computing system. The system further includes a processing circuit comprising a processor and memory. The processing circuit is structured to determine required verification information needed to process a loan application associated with a loan applicant. The processing circuit is further structured to search the account database to locate first information related to the applicant. The processing circuit is structured to determine that second information is required after locating the first information in the internal database. The processing circuit is further structured to initiate a request for the second information to an information provider computer system, the request accompanied by an identifier containing identifying information of the loan applicant. The processing circuit is structured to receive the requested additional information from the information provider computer system. The processing circuit is further structured to determine a loan decision for the loan application based at least in part on the first information and the second information.

These and other features, together with the organization and manner of operation thereof, will become apparent from the following detailed description when taken in conjunction with the accompanying drawings.

DETAILED DESCRIPTION

According to example embodiments, lending data collection and verification systems and methods are described that provide an option to conditionally use real-time interaction between financial institutions and other data sources to exchange information. The lending data collection and verification system and methods may enable lending data to be collected and verified by a loan originator based on user provided identity information (e.g., a user identity token, such as a user's e-mail address, social security number, phone number, etc.). In some arrangements, a lending data intermediary service is used as a conduit for information exchange between a loan originator and information providers in connection with the lending data collection and verification actions. The lending data intermediary service provides a conduit for the real-time information transfer. The real-time interaction between financial institutions may include operations such as account inquiries, transaction postings, tax information, debt information, and the like. Where the real-time data is not available from third-party information providers (e.g., other financial institutions, government agencies, insurance companies, etc.), the lending data collection and verification system and methods can instruct the loan requestor to supply the required lending data via an automated generation of a task list associated with the required lending data.

Figure 1:
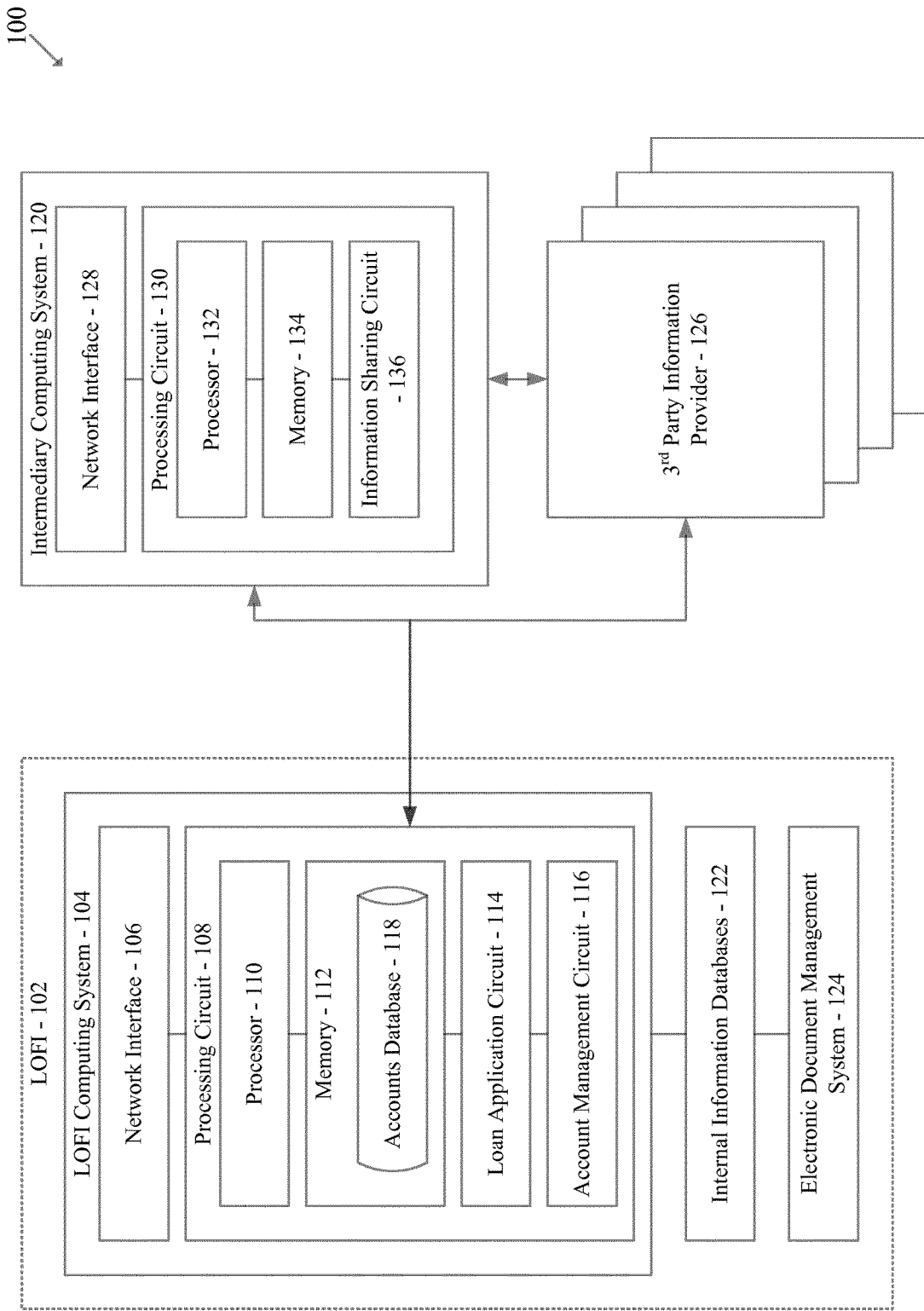
FIG. 1 is a schematic diagram of a lending data collection and verification system.

Referring to FIG. 1, a schematic diagram of a lending data verification system 100 is shown according to an example embodiment. The lending data verification system 100 is utilized by a loan originating financial institution ("LOFI") 102 to retrieve and verify information concerning a loan requestor (i.e., a loan applicant) during the loan application and approval process. Examples of loan originating financial institutions can include banks, credit unions, loan servicers, government sponsored entities ("GSE"), etc. The LOFI 102 is associated with a loan originating financial institution ("LOFI") computing system 104. In some arrangements, each location of the LOFI 102 (e.g., each bank branch) includes an LOFI computing system 104. In an alternative arrangement, each physical location of the LOFI 102 may be serviced by a central LOFI computing system (e.g., via a basic terminal access to interface with the FI computing system 104), which can be located in a central location, such as a central server. Further, an interface to the LOFI computing system 104 may be accessed via a network connection. For example, via an http client, such as the internet and/or a private banking network.

The LOFI computing system 104 may be accessible by loan originating personnel at the LOFI 102. In one example, a loan originating personnel can input a loan requestor's loan application into the LOFI computing system 104. In one embodiment, the loan application can include personally identifiable information ("PII") related to the identity of the loan requestor. In further examples, a loan requestor can enter information into the LOFI computing system 104 remotely, such as via a web interface. The LOFI computing system 104 can evaluate the loan application and generate a request for required verification data associated with the loan application. The required verification data can include tax information (e.g. W-2, 1099, etc.), account information (savings, checking, money market, 401k, brokerage accounts, etc.), outstanding debt information, as well as other verification data such as bankruptcy or receivership filings, outstanding money judgments, instances of fraud, employment verification, income verification, etc. The above types of lending data are for illustrative purposes, and it should be understood that any data associated with applying for a consumer loan, can be requested by the LOFI computing system 104, as needed. As described in further detail below, at least a portion of the information needed to evaluate the loan requestor may be obtained via a real-time information exchange system.

The LOFI computing system 104 includes a network interface 106. The network interface 106 is used to establish connections with other computing systems by way of a network (e.g., the internet, a private banking network, etc.). The network interface 106 includes program logic that facilitates connection of the LOFI computing system 104 to the network. For example, the network interface 106 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface 106 includes the hardware and machine-readable media sufficient to support communication over multiple channels of data communication. Further, in some arrangements, the network interface 106 includes cryptography capabilities to establish a secure or relatively secure communication session in which data communicated over the session is encrypted.

Still referring to FIG. 1, the LOFI computing system 104 includes a processing circuit 108 having a processor 110 and memory 112. The processor 110 may be implemented as a general-purpose processor, an application specific integrated circuit (ASIC), one or more field programmable gate arrays (FPGAs), a digital signal processor (DSP), a group of processing components, or other suitable electronic processing components. The memory 112 includes one or more memory devices (e.g., RAM, NVRAM, ROM, Flash Memory, hard disk storage, etc.) that store data and/or computer code for facilitating the various processes described herein. Moreover, the memory 112 may be or include tangible, non-transient volatile memory or non-volatile memory.

The LOFI computing system 104 includes a loan application circuit 114 and an account management circuit 116. Although FIG. 1 shows the loan application circuit 114 and the account management circuit 116 as part of the processing circuit 108, in other arrangements one of or both of loan application circuit 114 and/or the account management circuit 116 are embodied as separate processing circuits. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The loan application circuit 114 is structured to receive a loan application or a line of credit application from a loan requestor, request and verify loan requestor information from third-parties, request and verify loan requestor information from the loan requestor, and evaluate loan applications. In some arrangements, the loan application circuit 114 includes a requestor task creation system that is structured to automatically send requests for information to the loan requestor when additional lender data is required (i.e., when information cannot be obtained through the system 100). The account management circuit 116 is structured to perform various account management functions, including maintaining an accounts database 118, updating account balances, applying interest to accounts, processing payments related to accounts, and the like.

The LOFI computing system 104 includes the accounts database 118. In some arrangements, the memory 112 includes the accounts database 118. The accounts database 118 is configured to hold, store, categorize, and otherwise serve as a repository for information associated with accounts (e.g., loan accounts, savings accounts, checking accounts, credit accounts, etc.) held by the LOFI 102. For example, the accounts database 118 may store account numbers, account balances, account ownership information, and the like. The accounts database 118 is structured to selectively provide access to information relating to an account at the LOFI 102.

During the loan application process, the LOFI computing system 104 determines what lending data is required to process the loan application. In doing so, the LOFI computing system 104 may query one or more internal or external databases—directly or indirectly via an intermediary computing system 120—in order to obtain the required lending data to process the loan application. In one embodiment, the LOFI computing system 104 can query internal information databases 122. The internal information databases 122 can be one or more databases internal to the LOFI 102, containing internal information. For example, the internal information databases 122 can include account information, loan histories, personal information, etc., related to previous or existing clients of the LOFI 102. For example, the LOFI 102 may have access to some of the required lending data where the loan requestor has previously been, or is currently a client of the LOFI 102 (e.g., documents and account information previously provided in connection with a prior loan request). Additionally, the LOFI computing system 104 can receive information from an electronic document management system 124 associated with the LOFI 102. The electronic document management system 124 can receive documents from loan requestors (e.g., paper documents, digital documents from a loan requestor computing device, etc.), scan the received documents (if the documents are paper), perform data recognition on the digital and scanned documents (e.g., optical character recognition), and extract required information from the documents.

The LOFI computing system 104 can query computing systems associated with third-party information providers 126 to obtain the required lending data. Each of the computing systems associated with a given third-party information service provider includes a network interface (e.g., similar to the network interface 106), a processing circuit having a processor and memory (e.g., similar to the processing circuit 108 of the LOFI computing system 104), and an information database storing information relating to customers and users of the third-party information service 126. In some arrangements, the information retrieval from the third-party information providers 126 is achieved via an intermediary computing system 120. The third party information providers 126 may include any combination of other financial institutions (e.g. bank, brokerage house, credit union, etc.), government entities (e.g., an Internal Revenue Service database, a State Department database, a department of motor vehicles database, etc.), employers, credit agencies, insurance providers, service providers, and the like.

For example, the LOFI 102 can access a partner financial institution to retrieve account balances, outstanding debts, revolving or other credit lines, balances over time, expenditures and/or any other information available relating to a loan requestor. As another example, the LOFI 102 can access a transaction data aggregator to obtain financial or other transactions by the loan requestor over a specified period of time (e.g., the prior six months). The transaction data aggregator can provide information concerning credit applications (e.g. revolving, secured, etc.), money transfers, mortgage applications, and/or other relevant transactions. As a further example, the LOFI 102 can access tax records associated with the loan requestor from a government agency or from a tax service provider. The above examples of third-party databases are used for illustrative purposes, and it should be understood that any information concerning the loan requestor that is stored and maintained by a third-party may be accessed via the system 100 if the third-party participates in the system 100.

As noted above, in some arrangements, the third-party information providers 126 are accessed via an intermediary computing system 120. The intermediary computing system 120 facilitates the real-time retrieval and verification of information by the LOFI computing system 104 and from the third-party information providers 126. In some arrangements, the intermediary computing system 120 is associated with an intermediary service that is configured to facilitate real-time interbank fund transfers, e.g., an intermediary service provided by a non-financial institution. The intermediary service may, for example, be an entity that is formed as a joint venture between financial institutions such as banks, and/or other entities that send and receive data (financial transactions, account information, identify verification, asset verification, etc.) using the intermediary computing system 120. An example intermediary service is described in U.S. patent application Ser. No. 15/045,215, entitled "REAL-TIME INTERBANK TRANSACTIONS SYSTEM AND METHOD," by Hecht et al., which is herein incorporated by reference in its entirety and for all purposes.

The intermediary computing system 120 includes a network interface 128 and a processing circuit 130. The network interface 128 is similar to the network interface 106 of the LOFI computing system 104. Accordingly, the network interface 128 is structured to facilitate data communication over networks (e.g., the internet, private banking networks, etc.) with other computing systems (e.g., the LOFI computing system 104, computing systems associated with the third-party information providers 126, etc.). The processing circuit 130 includes a processor 132 and memory 134. The processor 132 may be implemented as a general-purpose processor, an application specific integrated circuit (ASIC), one or more field programmable gate arrays (FPGAs), a digital signal processor (DSP), a group of processing components, or other suitable electronic processing components. The memory 134 includes one or more memory devices (e.g., RAM, NVRAM, ROM, Flash Memory, hard disk storage, etc.) that store data and/or computer code for facilitating the various processes described herein. Moreover, the memory 134 may be or include tangible, non-transient volatile memory or non-volatile memory. The intermediary computing system 120 also includes an information sharing circuit 136. Although FIG. 1 shows the information sharing circuit 136 as part of the processing circuit 130, in other arrangements the information sharing circuit 136 is embodied as a separate processing circuit. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The information sharing circuit 136 is structured to facilitate the real-time sharing and verification of information related to loan requestors. Detailed interaction between the LOFI computing system 104, intermediary computing system 120, and the third-party information provider 126 computing systems are discussed in more detail below.

In some instances, the LOFI computing system 104 may be able to obtain real-time data directly from the third-party information providers 126. For example, a tax data aggregator may provide the LOFI computing system 104 real-time access to a database containing tax information relating to loan requestors. In some arrangements, the access is provided via a paid service or membership offered by the third-party information provider 126 and purchased by the LOFI 102. For example, the LOFI 102 may have an account or membership with a tax aggregate service such as Intuit® or PointServ®, thereby allowing the LOFI computing system 104 direct access to the requested information stored on the associated third-party information provider 126 computing systems. Thus, in such arrangements, the intermediary service may not be needed for real-time information access to lending data.

Figure 2:
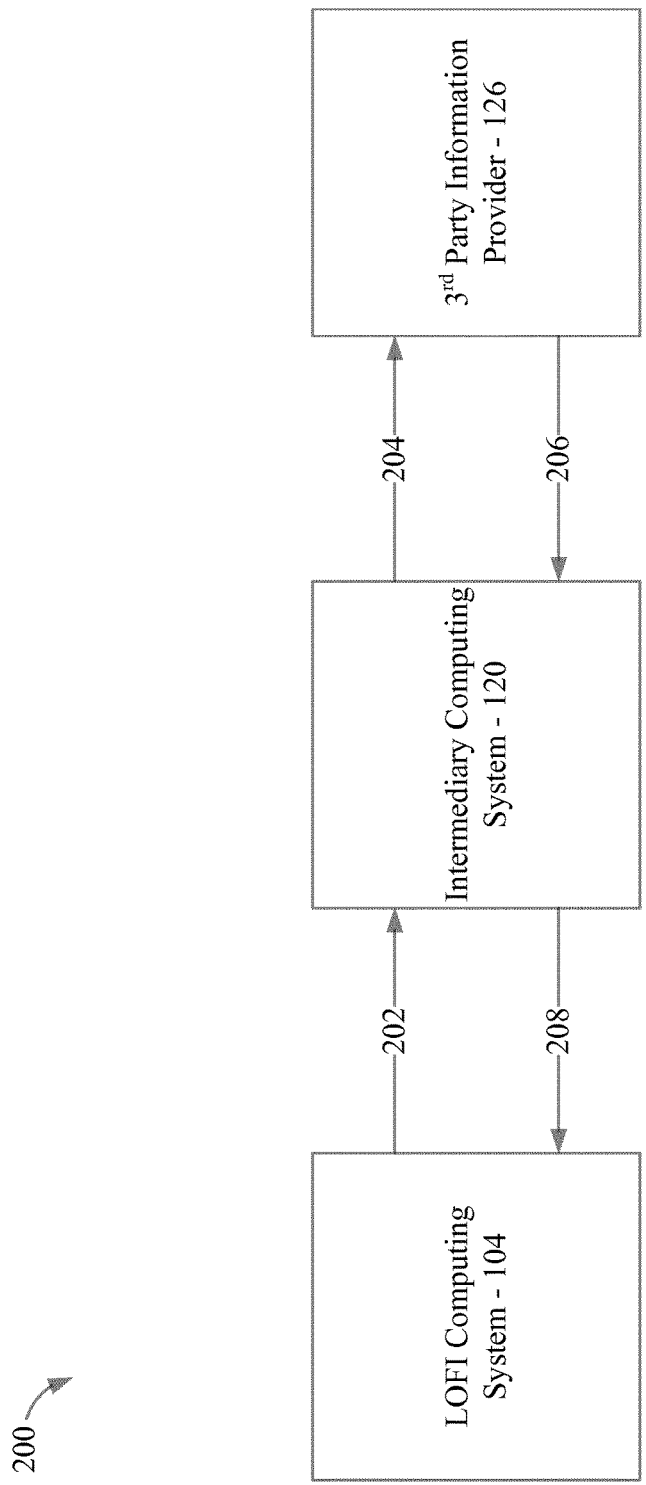
FIG. 2 is view of an information retrieval method utilizing the intermediary computing system of FIG. 1.

In other instances, the LOFI computing system 104 can leverage the services provided by the intermediary computing system 120 to obtain real-time information from the third-party information providers 126. Referring to FIG. 2, a view of an information retrieval method 200 utilizing the intermediary computing system 120 is shown according to an example embodiment. The method 200 is performed by the LOFI computing system 104, the intermediary computing system 120, and a computing system associated with a third-party information provider 126. The described communication between the various computing system occurs over a real-time data channel.

The method 200 begins when the LOFI computing system 104 transmits an information inquiry to the intermediary computing system 120 at 202. The inquiry includes a loan requestor token (e.g., an account number associated with the loan requestor, an e-mail address, a phone number, a social security number, a username, etc.) that serves as a proxy for the identity of the loan requestor. In some arrangements, the LOFI computing system 104 generated the loan requestor token. The use of tokens instead of actual personally identifying information provides an added layer of data theft protection thereby further protecting the integrity of the loan application process. In some arrangements, the inquiry includes an identity of a target third-party information provider 126 (e.g., a routing number, etc.) and an identification of requested information (e.g., bank statements for the past six months, pay stubs, tax information, credit information, etc.). In other arrangements, the inquiry does not include an identity of a target third-party information provider 126 but still includes the identification of requested information.

The intermediary computing system 120 routes the information inquiry to the appropriate third-party information provider 126 computer system at 204. The intermediary computing system 120 analyzes and identifies the appropriate third-party information provider 126 based on the contents of the information inquiry. The appropriate third-party information provider 126 may be identified, for example, based on a provided routing number, an institution name, a type of document requested, an institution code, or the like. In some situations, no third-party information provider 126 can be identified (e.g., if the LOFI 102 is requesting information from a third-party that does not participate in the system 100). In such situations, the intermediary computing system 120 can return an error message to the LOFI computing system 104 at 204 instead of routing the inquiry to a third-party information provider 126 computer system. However, the description of the method 200 continues under the assumption that at least one third-party information provider 126 can be identified. In other situations, multiple third-party information providers 126 may be identified in arrangements where the inquiry does not include an identity of a target third-party information provider 126 but still includes the identification of requested information (e.g., if a single inquiry corresponds to "all known information relating to person X") or if the request includes multiple third-party information provider 126 identities. In some situations, the intermediary computing system 120 can generate and attach a reference number to each inquiry sent to a given third-party information provider 126 such that any responses received can be correlated to the correct inquiry and returned to the correct requesting party (i.e., to the LOFI 102 in the method 200). The inquiry is then forwarded on to the computing system(s) associated with the identified third-party information provider(s) 126.

The third-party information provider 126 computing system transmits an inquiry response to the intermediary computing system 120. After receiving the inquiry from the intermediary computing system 120, the third-party information provider 126 computing system analyzes the inquiry and identifies any relevant information relating to the inquiry contained in internal information databases (e.g., account databases, credit databases, tax databases, employment record databases, etc.). The third-party information provider 126 computing system then formats and transmits a response message to the intermediary computing system 120. The response message includes the inquiry reference number and any relevant documents. In arrangements where no relevant documents are found, an indication that the inquiry returned no relevant documents is included in the response message. In arrangements where relevant documents are found, either the documents themselves (e.g., attached as PDFs, image files, etc.) or at least one pointer (e.g., a token used to later retrieve the documents from the third-party information provider's databases, a URL used to retrieve the documents, etc.) to the documents is included in the response message.

The intermediary computing system 120 sends the response message to the LOFI computing system 104 at 208. Upon receipt of the response message from the third-party information provider 126 computing system, the intermediary computing system 120 identifies the appropriate receiving requestor (i.e., the LOFI 102) based on the reference number included in the response message (e.g., by cross-referencing an internal database that correlates reference numbers to requestors). The response message is then routed to the LOFI computing system 104.

Figure 3:
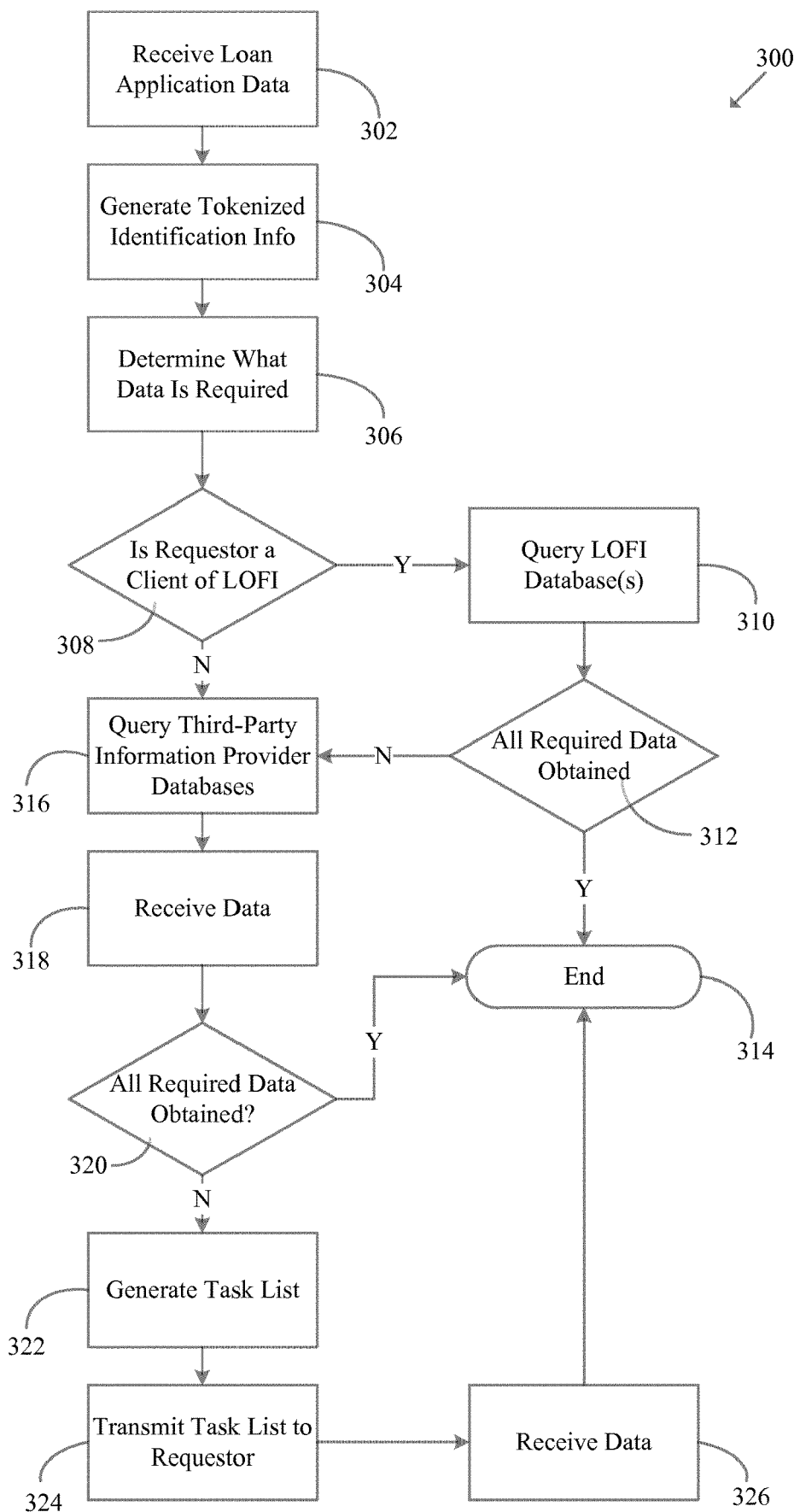
FIG. 3 is a flow diagram of a lending collection and verification method according to an example embodiment.

Referring to FIG. 3, a flow diagram of a lending data collection and verification method 300 is shown according to an example embodiment. The method 200 is performed by a LOFI computing system (e.g., the LOFI computing system 104) during a loan application process. For example, the method 200 may be performed when a loan requestor (i.e., a loan applicant) is applying for a new line of credit, such as a mortgage, a personal line of credit, a new credit card, or the like. The method 300 begins at 302 when loan application data is received by the LOFI computing system. In one arrangement, a loan application can be generated by a loan officer, or other employee, of the LOFI (e.g., LOFI 102) at the direction of a loan requestor. Alternatively, the loan application may be generated directly by a loan requestor via a user interface of a remote banking application (e.g., a mobile banking app, a web interface, etc.) provided by the LOFI. For example, the loan requestor may be able to generate the loan application via a web-based interface, thereby allowing the loan requestor to generate the loan request from a remote location, such as their home, office, or other location where they have access to the internet. In one embodiment, prior to receiving the loan application data, the LOFI computing system generates the loan application, which can include requesting required personal and other information into the application form, and requesting authorization for the LOFI to request access to required information available with third-party information providers (e.g., the third-party information providers 126). As discussed above, required lending data may include asset verification, tax information, credit information, etc.

At 304, the LOFI computing system can generate a tokenized identification of the loan requestor. As discussed above with respect to FIGS. 1 and 2, the tokenized identification can be a string of characters that represents an encoded version of a loan requestor's identity. In some embodiments, the tokenized identification can be an account number of the loan requestor. Alternatively, the tokenized identification can be a tokenized representation of any other type of personal identifying information, such as a social security number, a name, a tax identification number, birthdate, an e-mail address, a phone number, etc. In one embodiment, the tokenized identification is used exclusively when querying any database, either within the LOFI or external to the LOFI. However, in some examples, the tokenized identification may be used only when communicating with external information sources.

At 306, the LOFI computing system determines what information is required to complete the loan application. The type of information required may depend on the type of loan being requested. For example, a first mortgage may require more information and verification than a home-equity loan. Furthermore, the required information and verification may vary based on the amount of the loan, duration of the loan, etc. The type of information and verification required varies based on standard industry practices specific to each type of loan. The type of information required may include, for example, any combination of credit information, employment verification documents, income verification documents, asset verification documents, filed tax forms, personal information verification documents, and the like.

Once the LOFI computing system determines what information is needed to complete the loan application, the LOFI computing system determines if the loan requestor is a previous or existing client of the LOFI at 308. If it is determined that the loan requestor is a previous or existing client of the LOFI, the LOFI computing system can query the internal LOFI database(s) to obtain lending data required for the loan application at 310. For example, if the loan requestor is a consumer banking client of the LOFI, the LOFI computing system can query the current databases storing information relating to accounts associated with the loan requestor to determine balances, outstanding debts, monthly transactions, rolling average account balances, number of overdraws, etc. Further, the LOFI computing system may be able to access other personal information associated with the loan requestor, such as a current address, phone number, SSN, recent copies of government issued documents (e.g., driver's license, passport, residency information, property information, etc.) or other personally identifying information stored in other databases associated with the LOFI for use in verifying a loan application.

The LOFI computing system determines if all the required information was able to be obtained by querying the LOFI database(s) at 312. If the all the required information is determined to be gathered, the method 300 can end at 314, and the loan application can be completed. However, if all the required information was not able to be obtained, the LOFI computing system queries third-party information provider databases at 316. Further, if at 308 the LOFI computing system determines that the loan requestor is not a current or previous client of the LOFI, the LOFI computing system queries the third-party information provider databases at 316. As discussed above, third-party information providers (e.g., the third-party information providers 126) can include any combination of other financial institutions (e.g. bank, brokerage house, credit union, etc.), government entities (e.g., an Internal Revenue Service database, a State Department database, a department of motor vehicles database, etc.), employers, credit agencies, insurance providers, service providers, and the like. In some embodiments, the LOFI computing system queries one or more intermediary services, which can provide real-time or near real-time information relating to the requestor as discussed above with respect to FIG. 2.

The LOFI computing system receives data from the third-party information providers at 318. At 320, the LOFI computing system determines if all the required information has been obtained. If the LOFI computing system determines that all of the required data has been obtained, the method 300 ends at 314, and the loan application can be completed. If the LOFI computing system determines that all of the required data has not been obtained, the LOFI computing system generates a task list at 322. The task list can include a list of remaining documents or other information that is still needed to complete the loan application. The task list can then be provided to the loan requestor by the LOFI computing system (e.g., by sending the list to a requestor computing device). In one embodiment, the task list can be electronically provided to the loan requestor (e.g., via e-mail, text message, push alert through a dedicated LOFI app, etc.). In other embodiments, the task list may be accessible by the loan requestor via an on-line (e.g., internet-based) interface, via an account with the LOFI. The on-line interface may allow the loan requestor to upload the required data and/or documents via the on-line interface. In one embodiment, the LOFI computing system generates the task list internally. Alternatively, the LOFI computing system may use a requestor task creation system, as discussed above with respect to the loan application circuit 114. In one embodiment, completion of the task list is facilitated via the electronic document management system 124. The electronic document management system may be hosted by the LOFI computing system, as will be described in more detail below. Alternatively, the LOFI may use a third-party to host and manage the electronic document management system. Once the task list has been created, the LOFI computing system transmits the task list to loan requestor at 324. At 326, the LOFI computing system receives the required data from the loan requestor. In some arrangements, the data is received via the electronic document management system. Once the data has been received from the loan requestor, the method 300 can end at 314. In one embodiment, if the LOFI computing system does not receive the data from the loan requestor with a specified amount of time, the method 300 also ends at process block 314, and the loan application may be denied. Alternatively, if the data is received by the requestor in the predetermined amount of time, the method 300 ends at 314, and the loan application can be processed.

Figure 4:
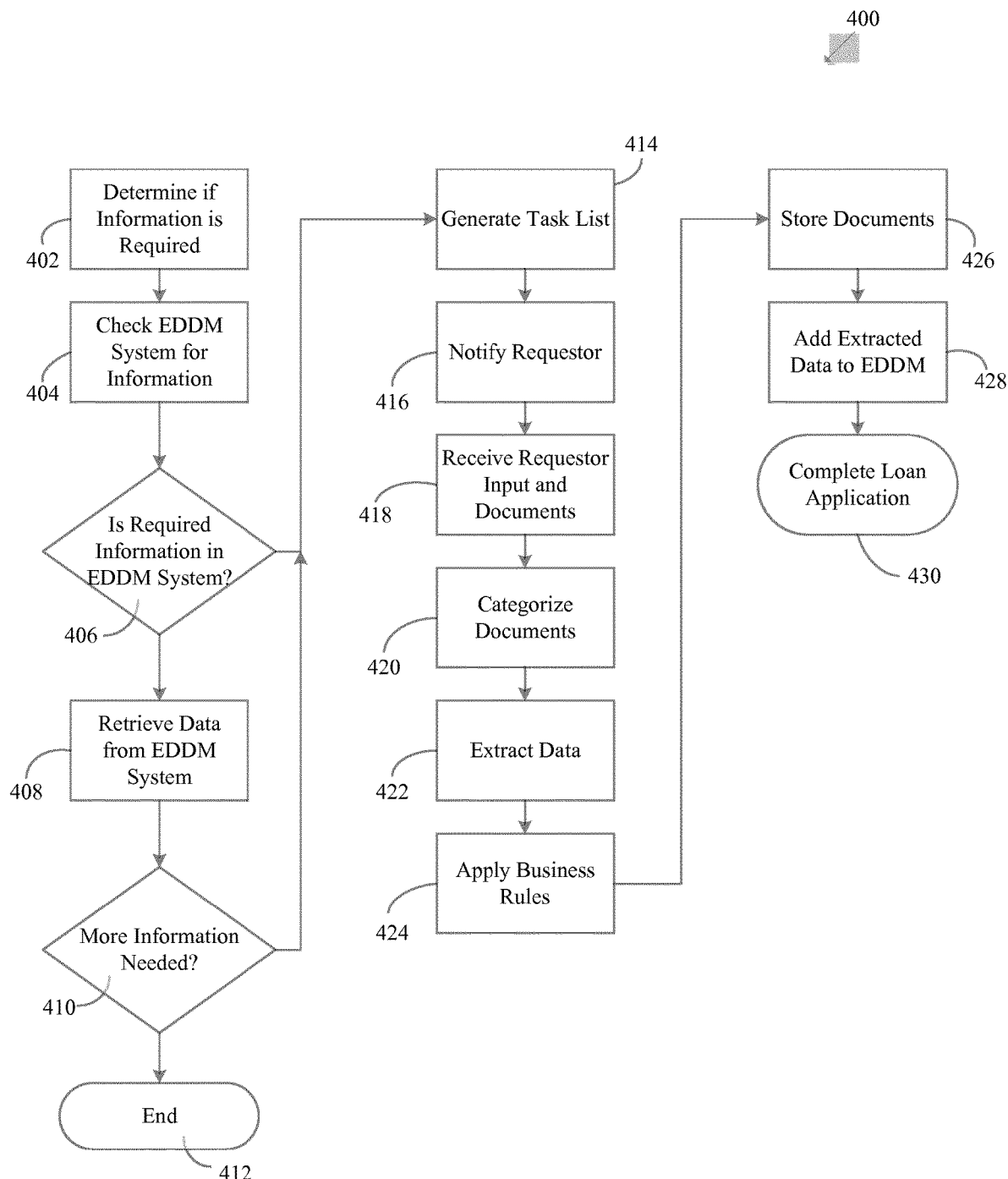
FIG. 4 is a flow diagram of a method for automatically requesting and processing lending data from a loan requestor according to an example embodiment.

Referring now to FIG. 4, FIG. 4 is flow diagram of a method 400 for automatically requesting and processing lending data from a loan requestor. The method 400 is performed by a LOFI computing system (e.g., LOFI computing system 104). As described above with respect to FIG. 3, in some instances the LOFI may not be able to verify all information required to complete a loan application by communicating with the third-party information providers directly, or via the intermediary computing system. In these instances, it may be necessary to have the requestor provide additional documentation to the LOFI to verify the information provided in their loan application. The method 400 provides an efficient and automated system for directing the requestor to provide the required information, and to collect, organize, and record said provided information. The method 400 begins at 402 when the LOFI computing system determines if additional information is required from a requestor to complete a loan application. For example, the LOFI computing system may make the determination at 320 of method 300. In some arrangements, the required additional information may be data that can be input or provided directly by a requestor, such as an address, account numbers, SSN, etc. Further, the information may be actual documentation, such as balance statements, utility bills, tax returns, etc. The required information may also include any data discussed above, or any other type of data required to complete a loan application.

Once the LOFI computing system determines that additional information is needed from the requestor, the LOFI computing system can check an electronic document management system (e.g., the electronic document management system 124) to determine if the required information or documents had previously been provided by the requestor at 404. In one arrangement, the electronic document management system may be part of the LOFI computing system. Alternatively, the electronic management system can an external system. If some or all of the required information is located or accessible via in the electronic management system, the LOFI computing system retrieves the data at 408. After any data is retrieved at 408, the LOFI computing system determines if more information beyond what was gathered is needed at 410. If all the required data has been determined to be collected and/or verified, the process 400 ends at 412. However, if all the required lending data has not been collected and/or verified, a task list can be created by the LOFI computing system at 414. In some arrangements, the task list is created by the LOFI computing system at 414 when the LOFI computing system determines that no required information is contained in the electronic document management system related to a requestor at 406.

Figure 5:
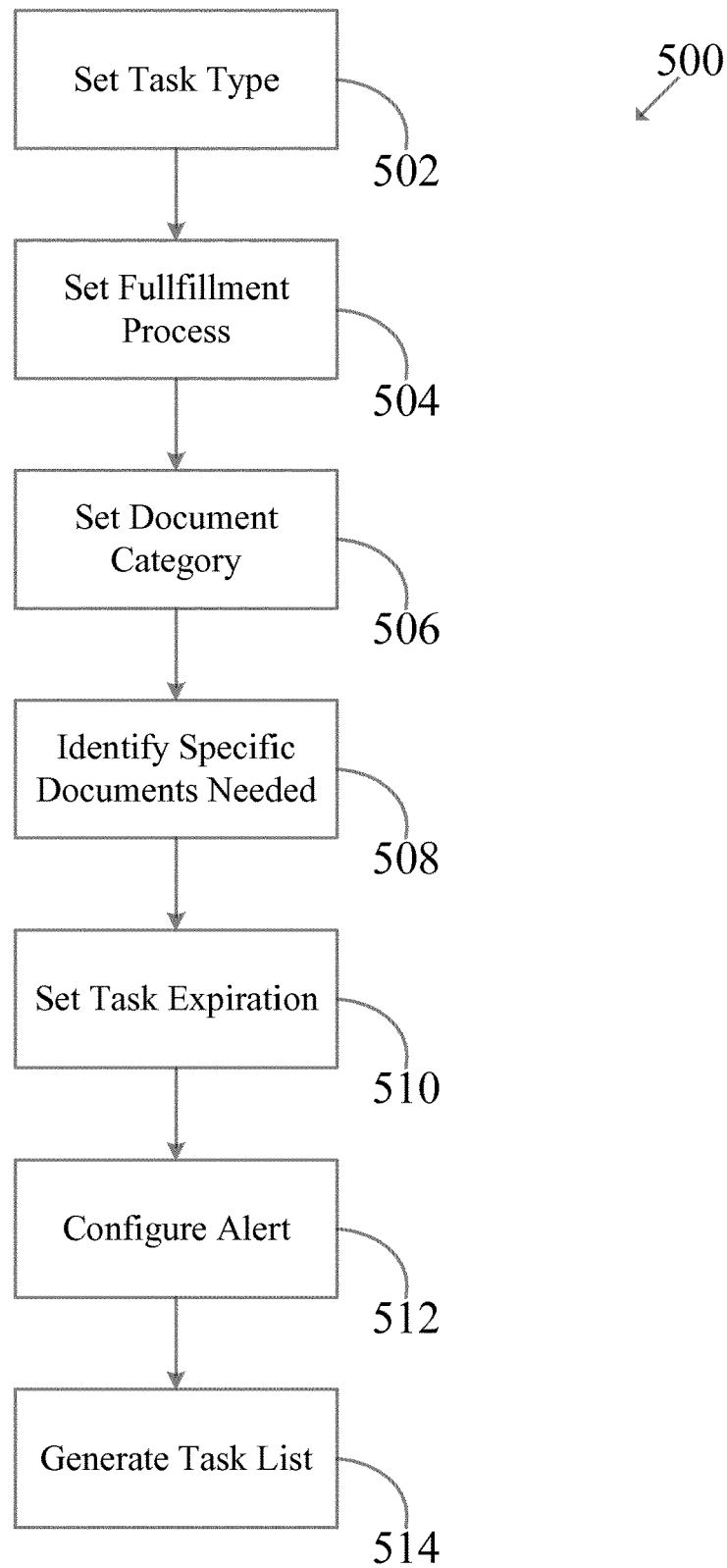
FIG. 5 is a flow diagram of a method for generating a task list according to an example embodiment.

The LOFI computing system generates a task list having a list of information required to complete the loan application at 414. Turning briefly to FIG. 5, a method 500 for generating the task list is shown according to an example embodiment. The method 500 is also performed by the LOFI computing system. The method 500 occurs at 414 of the method 400. At 502, the LOFI computing system sets a task type for each required task. Example task types can include document requests, data entry, account access, etc. At 504, the LOFI computing system sets a fulfillment process. The fulfillment process defines the reasoning as to why the requested information in the task list is needed. Example fulfillment processes can include account opening, home loan application, consumer loan application, loan modification, etc.

At 506, the LOFI computing system sets a document category for each requested item in the task list. Example document categories can include tax, checking accounts, savings accounts, loan documents, address verification, etc. The document categories may be automatically selected based on the type of fulfillment process set, and parameters associated with completing said fulfillment process. Additionally, the LOFI computing system may set document categories based on information that is required, but was not able to be previously retrieved (e.g., during the method 300). Alternatively, an authorized LOFI employee may be able to manually set the document type based on the current status of the loan application, or at a prompting from a system such as a LOFI lending data verification system. In some examples, more than one document type may need to be set, based on what information is required to complete the loan application.

Based on the set document type, the LOFI computing system identifies specific documents needed at 508. The documents to be requested may be of the same document type(s) as set in 506. For example, if the selected document category selected at 506 was "tax," then possible document selections could include IRS electronic TIN-EIN confirmation letters, IRS W-2 forms, IRS W-7 forms, IRS 1099 forms, etc. In some example, a list of all required tax documents can be populated within the required document type. The possible documents may then be selected either manually by an authorized LOFI employee, or automatically based on the documents required to complete the loan application. At 510, the LOFI computing system sets a task expiration. The task expiration date may be the final date in which the required document can be received from the loan requestor without affecting the loan application. In some embodiments, the task expiration date can be set automatically based on general procedures of the LOFI. Alternatively, the expiration date may be a date agreed upon in the original loan application. Further, the task expiration date may be a predetermined time period associated with a given document or document type requested. For example, a tax document request may be have a default predetermined expiration time period of 30 days. However, it is understood that the expirations dates can be more or less than 30 days, and may be adjustable depending on various parameters, such as loan type, requestor requirements, etc. At 512, the LOFI computing system can configure an alert that is triggered if the requested document(s) are not received by a predetermined time. In one embodiment, the alert can be set to provide a notification when the requested document(s) have not been received by period of time prior to the expiration date. The alert may be provided to a requestor.

At 514, the LOFI computing system generates the task list and transmits the task list to the loan a requestor. The task list can then be accessed by the requestor via an interface to the LOFI, for example, via a website of the LOFI that allows the requestor access to the task list for their particular associated account. When the loan requestor provides documents to the LOFI computing system in response to the task list, the documents may be automatically processed by the electronic document management system for electronic storage and data extraction.

Returning to FIG. 4, the LOFI computing system provides a notification to the requestor at process block 416, informing them that additional information is needed. Example notifications can include e-mails, text messages, push notification via an application associated with the LOFI, etc. The notification may contain a link that the requestor can follow to access the generated task list associated with their account and/or loan application. If the requestor is an existing client of the LOFI, the requestor may be able to access the generated task list using their existing credentials to access their accounts with the LOFI. If the requestor is not a current client of the LOFI, the notification can provide temporary credentials to access the task list.

At 418, the requestor input and documents are received by the LOFI computing system. The requestor can use a LOFI task list interface to provide the required documents. For example, in one embodiments, the requestor can upload the documents directly to the LOFI via the LOFI task list interface. At 420, the LOFI computing system categorizes the uploaded documents. Example document categories may include: tax, financial, legal/court, financial, employment, etc. At 422, the LOFI computing system extracts data from the uploaded documents. In one embodiment, predetermined taxonomy rules can be used to extract data from the uploaded documents. The taxonomy rules can be used to extract data by looking for common terms within the document. In one example, a set of taxonomy rules is used for all uploaded documents. In an alternative example, a specific set of taxonomy rules may be used for each document category or, in some examples, for each individual document. In some arrangements, the data extraction is facilitated through the electronic document management system. At 424, the LOFI computing system applies business rules to the extracted data. The business rules can provide instructions on how to interpret and retain the data (e.g., where to retain the data, who may access the data, etc.) At 426, the LOFI computing system stores the documents and any extracted data in an appropriate database of the LOFI computing system. The documents stored in the database can then be recalled at a later time by either the LOFI or the requestor.

At 428, the LOFI computing system can store any extracted data in a registry along with a reference to the document stored in the database. Once the data is stored in the registry, the LOFI computing system can then access the information to complete the loan application at 430. In one embodiment, a notification can be provided to the LOFI computing system from the electronic document management system indicating that the required information is now available to be processed with the loan application.

The above-described systems and methods provide for real-time collection and processing of lending data. The above-described systems and methods provide the real-time collection and processing of the lending through an enhanced computing system including a lending data intermediary computer system 306 that facilitates communication between the different financial institutions over real-time data channels 404. The described systems may utilize faster, more accurate processing than current financial computing systems to facilitate processing of loan applications in a faster and more secure manner, which addresses the processing times of current loan processing systems. Further, by providing an automated system for requesting additional information from loan requestors where the information cannot be obtained from other financial institutions, a more efficient and accurate system and method for processing loan applications is provided.

While the above embodiments are described with reference to verifying information for the purpose of processing loan applications, it is understood that the above systems and methods can be used for verifying information for a variety of operations within a financial institution, such as opening accounts, fraud prevention, etc. Further, the above systems and methods described above are not limited to use between financial institutions, and can be applied to various organizations having a need to verify information presented by a user for various purposes. For example, background checks for professional licenses, pharmaceutical verifications for patients, etc.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
a processing circuit having at least one processor coupled to at least one memory, the processing circuit configured to:
receive loan application data;
generate a loan requestor token comprising identifying information of a loan applicant;
determine verification information required to process a loan application of the loan applicant;
initiate a request for the verification information to an information computing system, the request comprising the loan requestor token and transmitted via a real-time data channel between the processing circuit and the information computing system;
receive, from the information computing system, a document comprising the verification information;
automatically extract, by data recognition logic, the verification information from the document based on a set of taxonomy rules;
generate at least one task comprising a requirement to fulfill based on determining additional information is required;
determine, in response to receiving an indication of a completion of the at least one task, a loan decision for the loan application based at least in part on the verification information and the additional information received subsequent to the completion of the at least one task; and
store the loan decision, the received document, the verification information, the additional information, and the set of taxonomy rules in a database.

2. The system of claim 1, the processing circuit further configured to:
determine additional verification information required to process the loan application associated with the loan applicant; and
search an internal database to locate the additional verification information associated with the loan applicant, wherein searching comprises one or more database queries utilizing the loan requestor token.

3. The system of claim 2, wherein the additional verification information is associated with at least one of a checking account, a savings account, or a money market account held by the loan applicant.

4. The system of claim 1, the processing circuit further configured to:
send the request to an intermediary computing system, wherein the intermediary computing system is in communication with the information computing system, and wherein the intermediary computing system is configured to forward the request to the information computing system via the real-time data channel.

5. The system of claim 4, wherein the intermediary computing system is an account verification service.

6. The system of claim 5, wherein the processing circuit is associated with a financial institution, and wherein the financial institution and one or more external financial institutions are members of the account verification service.

7. The system of claim 1, wherein the document is a first document, the processing circuit further configured to:
receive, from a user device associated with the loan applicant, a second document comprising additional verification information.

8. The system of claim 7, the processing circuit further configured to:

automatically extract, by the data recognition logic of the processing circuit, the additional verification information from the second document based on a second set of taxonomy rules.

9. The system of claim 1, the processing circuit further configured to:
    determine a task type that identifies an action category for the at least one task;
    set a fulfillment process, wherein the fulfillment process defines a reason for the generation of the at least one task;
    determine a document category for any required documents associated with the at least one task;
    identify a subset of specific documents required from the document category;
    determine an expiration date by which the at least one task must be completed; and
    configure an alert notification configured to notify the loan applicant when a predetermined amount of time remains before the expiration date.

10. The system of claim 9, the processing circuit further configured to:
    provide a list of tasks containing the at least one task to the loan applicant.

11. A method comprising:
    receiving, by a provider computing system, loan application data;
    generating, by the provider computing system, a loan requestor token comprising identifying information of a loan applicant;
    determining, by the provider computing system, verification information required to process a loan application of the loan applicant;
    initiating, by the provider computing system, a request for the verification information to an information computing system, the request comprising the loan requestor token and transmitted via a real-time data channel between the provider computing system and the information computing system;
    receiving, by the provider computing system from the information computing system, a document comprising the verification information;
    automatically extracting, by data recognition logic of the provider computing system, the verification information from the document based on a set of taxonomy rules;
    generating, by the provider computing system, at least one task comprising a requirement to fulfill based on determining additional information is required;
    determining, in response to receiving an indication of a completion of the at least one task, by the provider computing system, a loan decision for the loan application based at least in part on the verification information and the additional information received subsequent to the completion of the at least one task; and
    storing, by the provider computing system, the loan decision, the received document, the verification information, the additional information, and the set of taxonomy rules in a database of the provider computing system.

12. The method of claim 11, further comprising:
    determining, by the provider computing system, additional verification information required to process the loan application associated with the loan applicant; and
    searching, by the provider computing system, an internal database to locate the additional verification information associated with the loan applicant, wherein searching comprises one or more database queries utilizing the loan requestor token.

13. The method of claim 12, wherein the additional verification information is associated with at least one of a checking account, a savings account, or a money market account held by the loan applicant with the provider computing system.

14. The method of claim 11, wherein initiating the request for the verification information to the information computing system further comprises:
    sending the request to an intermediary computing system, wherein the intermediary computing system is in communication with the information computing system, and wherein the intermediary computing system forwards the request to the information computing system via the real-time data channel.

15. The method of claim 14, wherein the intermediary computing system is an account verification service.

16. The method of claim 15, wherein the provider computing system is associated with a financial institution, and wherein the financial institution and one or more external financial institutions are members of the account verification service.

17. The method of claim 11, wherein the document is a first document, the method further comprising:
    receiving, by the provider computing system from a user device associated with the loan applicant, a second document comprising additional verification information.

18. The method of claim 17, further comprising:
    automatically extracting, by the data recognition logic of the provider computing system, the additional verification information from the second document based on a second set of taxonomy rules.

19. The method of claim 11, wherein generating the at least one task further comprises:
    determining, by the provider computing system, a task type that identifies an action category for the at least one task;
    setting, by the provider computing system, a fulfillment process, wherein the fulfillment process defines a reason for the generation of the at least one task;
    determining, by the provider computing system, a document category for any required documents associated with the at least one task;
    identifying, by the provider computing system, a subset of specific documents required from the document category;
    determining, by the provider computing system, an expiration date by which the at least one task must be completed; and
    configuring, by the provider computing system, an alert notification configured to notify the loan applicant when a predetermined amount of time remains before the expiration date; and
    providing, by the provider computing system, a list of tasks containing the at least one task to the loan applicant.

20. One or more computer-readable storage media having instructions stored thereon that, when executed by a processing circuit, cause the processing circuit to:
    receive loan application data;
    generate a loan requestor token comprising identifying information of a loan applicant;
    determine verification information required to process a loan application of the loan applicant;

initiate a request for the verification information to an information computing system, the request comprising the loan requestor token and transmitted via a real-time data channel between the processing circuit and the information computing system;

receive, from the information computing system, a document comprising the verification information;

automatically extract, by data recognition logic, the verification information from the document based on a set of taxonomy rules;

generate at least one task comprising a requirement to fulfill based on determining additional information is required;

determine, in response to receiving an indication of a completion of the at least one task, a loan decision for the loan application based at least in part on the verification information and the additional information received subsequent to the completion of the at least one task; and store the loan decision, the received document, the verification information, the additional information, and the set of taxonomy rules in a database.

\* \* \* \* \*